United States Patent
Wang et al.

(10) Patent No.: US 12,506,803 B2
(45) Date of Patent: Dec. 23, 2025

(54) FILECOIN CLUSTER DATA TRANSMISSION METHOD AND SYSTEM BASED ON REMOTE DIRECT MEMORY ACCESS

(71) Applicant: INSPUR SUZHOU INTELLIGENT TECHNOLOGY CO., LTD., Jiangsu (CN)

(72) Inventors: Xiaofei Wang, Jiangsu (CN); Jian Wei, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 321 days.

(21) Appl. No.: 18/270,209

(22) PCT Filed: Nov. 30, 2021

(86) PCT No.: PCT/CN2021/134196
§ 371 (c)(1),
(2) Date: Jun. 29, 2023

(87) PCT Pub. No.: WO2023/019800
PCT Pub. Date: Feb. 23, 2023

(65) Prior Publication Data
US 2024/0106893 A1 Mar. 28, 2024

(30) Foreign Application Priority Data
Aug. 17, 2021 (CN) .......................... 202110940079.6

(51) Int. Cl.
*H04L 9/06* (2006.01)
*G06F 9/455* (2018.01)
(Continued)

(52) U.S. Cl.
CPC .... *H04L 67/1097* (2013.01); *G06F 15/17331* (2013.01); *H04L 67/06* (2013.01)

(58) Field of Classification Search
CPC ..... H04L 67/06; H04L 67/1097; H04L 67/02; G06F 15/17331
See application file for complete search history.

(56) References Cited

U.S. PATENT DOCUMENTS

| | | | |
|---|---|---|---|
| 10,554,407 B1 * | 2/2020 | Greco | ................... G06F 16/178 |
| 2010/0146068 A1 | 6/2010 | Haviv | |

(Continued)

FOREIGN PATENT DOCUMENTS

| | | | |
|---|---|---|---|
| CN | 101599991 A | 12/2009 | |
| CN | 103440202 A | 12/2013 | |

(Continued)

OTHER PUBLICATIONS

Youmin, Chen, et al. "Survey on RDMA-based distributed storage systems." J. Comput. Res. Dev 56 (2019): 227.

(Continued)

*Primary Examiner* — Nicholas R Taylor
*Assistant Examiner* — Ho T Shiu
(74) *Attorney, Agent, or Firm* — IPro, PLLC

(57) ABSTRACT

A filecoin cluster data transmission method and system based on RDMA, including: providing a RDMA interface; receiving and encapsulating sector data by a first node, invoking the RDMA interface to transmit the sector data, serially transmitting the sector data to a next encapsulation node; when receiving the sector data from a previous node, invoking the RDMA interface to directly transmit the sector data to a user mode memory of the node for encapsulation; invoking the RDMA interface to serially transmit the sector data back to the HCA card, and transmitting the sector data to a next node; receiving, by a last node, the sector data, invoking the RDMA interface to directly transmit the sector data to the user mode memory of the last node; invoking the RDMA interface to serially transmit the sector data back to (Continued)

the HCA card of the last node, and transmitting the sector data to distributed storage.

18 Claims, 3 Drawing Sheets

(51) Int. Cl.
*G06F 15/173* (2006.01)
*G06F 16/182* (2019.01)
*H04L 9/00* (2022.01)
*H04L 67/06* (2022.01)
*H04L 67/1097* (2022.01)

(56) References Cited

U.S. PATENT DOCUMENTS

| | | |
|---|---|---|
| 2010/0281201 A1 | 11/2010 | O'Brien et al. |
| 2013/0054726 A1 | 2/2013 | Bugge |
| 2014/0222945 A1 | 8/2014 | Noronha et al. |
| 2015/0286414 A1 | 10/2015 | Gordon et al. |
| 2017/0147518 A1 | 5/2017 | Gordon et al. |
| 2017/0171075 A1* | 6/2017 | Sajeepa .................. H04L 69/324 |
| 2019/0079897 A1* | 3/2019 | Kochevar-Cureton ...................... H04L 12/4641 |
| 2021/0157797 A1 | 5/2021 | Dutchak et al. |
| 2024/0356766 A1* | 10/2024 | Yu .......................... H04L 9/3239 |

FOREIGN PATENT DOCUMENTS

| | | |
|---|---|---|
| CN | 104539679 A | 4/2015 |
| CN | 108268208 A | 7/2018 |
| CN | 109981480 A | 7/2019 |
| CN | 110071900 A | 7/2019 |
| CN | 110191194 A | 8/2019 |
| CN | 111400212 A | 7/2020 |
| CN | 112398817 A | 2/2021 |
| CN | 112817887 A | 5/2021 |
| CN | 113395359 A | 9/2021 |
| EP | 1581875 A2 | 10/2005 |
| JP | 2008217214 A | 9/2008 |

OTHER PUBLICATIONS

Li, Bo, Dan Meng, and Zhigang Huo. "Study on RDMA-based high performance RPC in multi-core systems." Gaojishu Tongxin/Chinese High Technology Letters 21.7 (2011): 681.

Kalia, Anuj, Michael Kaminsky, and David G. Andersen. "Design guidelines for high performance RDMA systems." 2016 USENIX Annual Technical Conference.

* cited by examiner

FILECOIN CLUSTER DATA TRANSMISSION METHOD AND SYSTEM BASED ON REMOTE DIRECT MEMORY ACCESS

CROSS-REFERENCE TO RELATED APPLICATION

The present disclosure claims priority to Chinese patent application No. 202110940079.6, titled "FILECOIN CLUSTER DATA TRANSMISSION METHOD AND SYSTEM BASED ON REMOTE DIRECT MEMORY ACCESS", filed on Aug. 17, 2021 before the CNIPA, China National Intellectual Property Administration, which is incorporated herein in its entirety by reference.

TECHNICAL FIELD

The present disclosure relates to the technical field of data transmission between Filecoin cluster nodes, in particular to a data transmission method and system for Filecoin cluster based on remote direct memory access.

BACKGROUND

Web 1.0 appeared in the 1990s and early the 21st century. At that time, the Internet was a static, read-only HTML page, and the interconnection among users was quite limited. Web2.0, also known as read-write network, arose around 2004, and it is still in the Web2.0 era so far. Web2.0 consists of social media websites, blogs, and online communities where end users may interact and collaborate in real-time at any time. Web3.0 provides a better user-centric experience in a read-write network without intermediaries. This technique enables individuals to control data privacy and ownership by default. Web3.0 introduces a decentralized Internet, and in essence, web3.0 technology provides foundation for P2P communication, payment, services and markets.

SUMMARY

The present disclosure provides a data transmission method and system for Filecoin cluster based on remote direct memory access.

The technical solution of the present disclosure is as follows.

One aspect of the present disclosure provides a data transmission method for Filecoin cluster based on remote direct memory access, the Filecoin cluster includes a plurality of encapsulation nodes, and the method includes:
  providing a remote direct memory access (RDMA) protocol-based RDMA interface at a data transmission interface of the Filecoin cluster;
  receiving and encapsulating, by a first encapsulation node, sector data transmitted from a client, after the sector data is encapsulated, invoking the RDMA interface to transmit the encapsulated sector data to a host channel adapter (HCA) card of the first encapsulation node, and serially transmitting, via the HCA card, the encapsulated sector data to a HCA card of a next encapsulation node;
  in response to a HCA card of an encapsulation node receiving the sector data transmitted from a previous encapsulation node, invoking the RDMA interface to directly transmit the sector data to a user mode memory of the encapsulation node for encapsulation; after the sector data is encapsulated, invoking the RDMA interface to serially transmit the encapsulated sector data back to the HCA card, and transmitting, via the HCA card, the encapsulated sector data to the HCA card of a next encapsulation node; and
  receiving, by the HCA card of a last encapsulation node, the sector data transmitted from a previous encapsulation node, invoking the RDMA interface to directly transmit the sector data to the user mode memory of the last encapsulation node for encapsulation; after the sector data is encapsulated, invoking the RDMA interface to serially transmit the encapsulated sector data back to the HCA card of the last encapsulation node, and transmitting the sector data to distributed storage via the HCA card of the last encapsulation node.

In some embodiments, three Filecoin cluster includes three encapsulation nodes, respectively being P1 node, P2 node and C1 & C2 node; and a data encapsulation and transmission process of the method is as follows:
  receiving and encapsulating, by the P1 node, the sector data transmitted from the client, after the sector data is encapsulated, invoking the RDMA interface to transmit the encapsulated sector data to the HCA card of the P1 node, and serially transmitting the sector data to the P2 node via the HCA card of the P1 node;
  receiving, by the HCA card of the P2 node, the sector data, and invoking the RDMA interface to directly transmit the sector data to the user mode memory of the P2 node for encapsulation; after the sector data is encapsulated, invoking the RDMA interface to serially transmit the encapsulated sector data back to the HCA card of the P2 node, and transmitting the sector data to the C1 & C2 node via the HCA card of the P2 node; and
  receiving, by the HCA card of the C1 & C2 node, the sector data, and invoking the RDMA interface to directly transmit the sector data to the user mode memory of the C1 & C2 node for encapsulation; after the sector data is encapsulated, invoking the RDMA interface to serially transmit the encapsulated sector data back to the HCA card of the C1 & C2 node, and transmitting the sector data to the distributed storage via the HCA card of the C1 & C2 node.

In some embodiments, in the step of receiving and encapsulating, by the P1 node, the sector data transmitted from the client, after the sector data is encapsulated, invoking the RDMA interface to transmit the encapsulated sector data to the HCA card of the P1 node, and serially transmitting the sector data to the P2 node via the HCA card of the P1 node, the receiving and encapsulating, by the P1 node, the sector data transmitted from the client includes:
  receiving, by a network card of the P1 node, the sector data transmitted from the client; and
  copying the sector data received to the user mode memory of the P1 node step by step for encapsulation.

In some embodiments, the copying the sector data received to the user mode memory of the P1 node step by step for encapsulation includes:
  copying the sector data into a kernel mode memory corresponding to the network card of the P1 node from a memory of the network card;
  copying the sector data into a kernel mode memory corresponding to a P1 node process from the kernel mode memory corresponding to the network card;
  copying the sector data into a user mode memory corresponding to the P1 node process from the kernel mode memory corresponding to the P1 node process; and
  encapsulating the sector data in the user mode memory of the P1 node.

In some embodiments, after the sector data is encapsulated, invoking the RDMA interface by:
  detecting whether the sector data has been encapsulated;
  arranging the sector data that has been encapsulated in a queue in a sequential order; and
  invoking the RDMA interface according to the order of the queue.

In some embodiments, the method further includes installing a network card and a HCA card on a first encapsulation node, and installing the HCA card on other encapsulation nodes of the Filecoin cluster.

In some embodiments, when receiving the sector data transmitted from the client, the network card of the first encapsulation node receives the sector data transmitted from the client via a TCP/IP protocol.

Another aspect of the present disclosure provides a data transmission system for Filecoin cluster based on remote direct memory access, including a plurality of encapsulation nodes for sequentially encapsulating and transmitting sector data;
  each of the encapsulation nodes is provided with a remote direct memory access (RDMA) interface, a host channel adapter (HCA) card and a user mode memory, and data is transmitted among the encapsulation nodes via the HCA card;
  the system comprises an encapsulation module and an invocation module;
  a first encapsulation node is further provided with a network card for receiving the sector data transmitted from a client;
  wherein the encapsulation module is configured to encapsulate the sector data in the user mode memory;
  the invocation module is configured to invoke the RDMA interface to transmit the encapsulated data;
  the HCA card of a last encapsulated node is further configured to transmit the sector data to distributed storage.

In some embodiments, the encapsulation nodes include three nodes, respectively being P1 node, P2 node and C1 & C2 node; the P1 node is the first encapsulation node, and the C1 & C2 node is the last encapsulation node; the system further comprises a copying module;
  wherein the copying module is configured to copy the sector data received to the user mode memory of the P1 node step by step;
  the invocation module is configured to: invoke the RDMA interface to transmit, via the RDMA interface, the encapsulated sector data in the user mode memory of the P1 node to the HCA card of the P1 node; invoke the RDMA interface to directly transmit the sector data to the user mode memory of the P2 node; invoke the RDMA interface to serially transmit the encapsulated sector data in the user mode memory of the P2 node to the HCA card of the P2 node; invoke the RDMA interface to directly transmit the sector data to the user mode memory of the C1 & C2 node; and invoke the RDMA interface to serially transmit the encapsulated sector data in the user mode memory of the C1 & C2 node to the HCA card of the C1 & C2 node;
  the HCA card of the P1 node is configured to serially transmit the sector data to the P2 node;
  the HCA card of the P2 node is configured to receive the sector data transmitted from the P1 node; and further configured to transmit the encapsulated sector data in the user mode memory of the P2 node to the C1 & C2 node; and
  the HCA card of the C1 & C2 node is configured to receive the sector data transmitted from the P2 node, and further configured to transmit the encapsulated sector data in the user mode memory of the C1 & C2 node to the distributed storage.

In some embodiments, the P1 node is further provided with a kernel mode memory;
  the copying module is further configured to copy the sector data into a kernel mode memory corresponding to the network card of the P1 node from the memory of the network card; copy the sector data into a kernel mode memory corresponding to a P1 node process from the kernel mode memory corresponding to the network card; copy the sector data into the user mode memory corresponding to the P1 node process from the kernel mode memory corresponding to the P1 node process.

BRIEF DESCRIPTION OF THE DRAWINGS

In order to explain technical solutions of embodiments of the present disclosure or the related art more clearly, drawings used in the description of the embodiments or the related art will be briefly introduced below, and it would be apparent for those skilled in the art to obtain other drawings according to these drawings without involving any creative effort.

DETAILED DESCRIPTION

Figure 1:
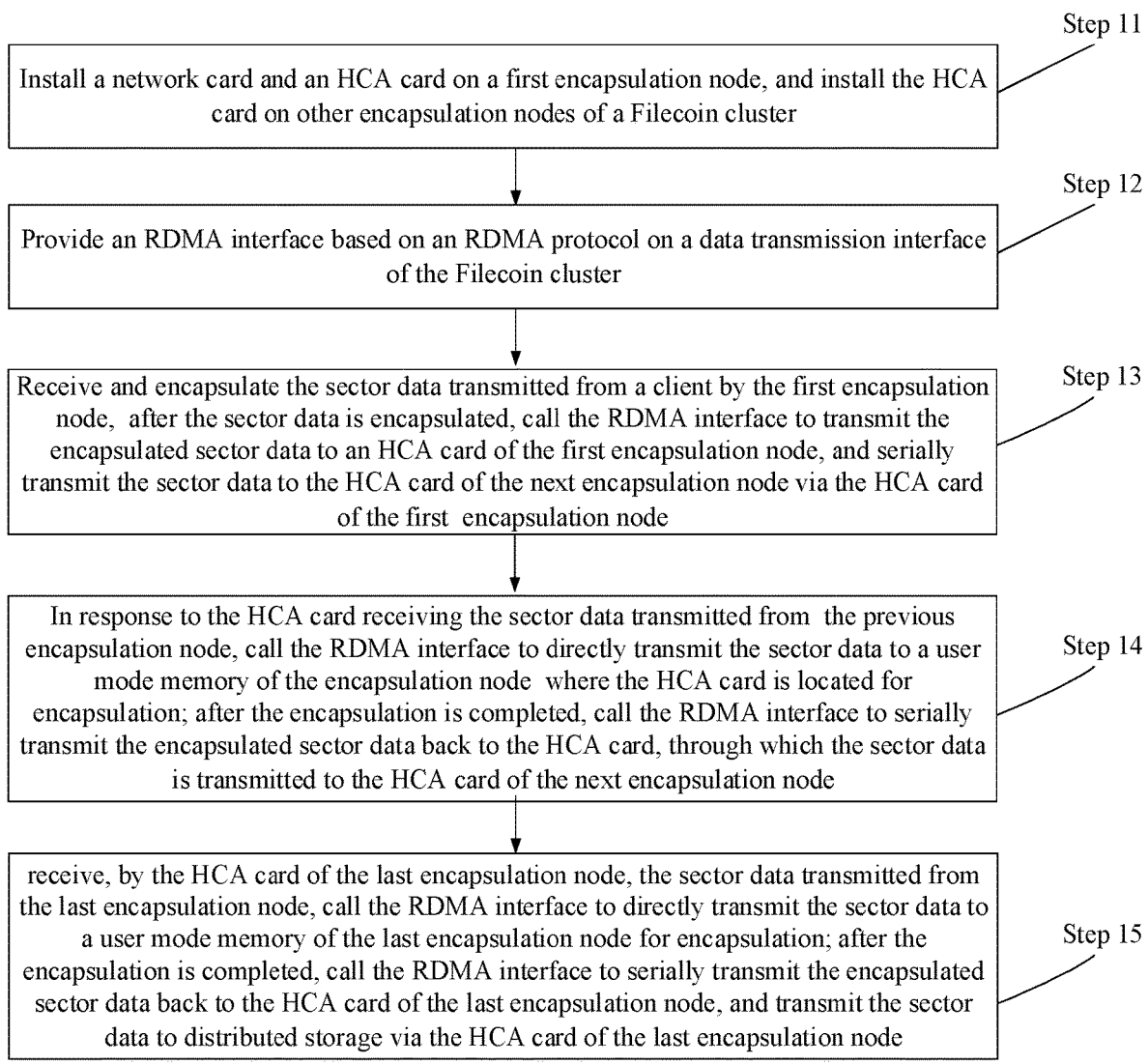
FIG. 1 is a schematic flow diagram of a method according to an embodiment of the present disclosure.

In order to enable those skilled in the art to better understand the technical solution of the present disclosure, a clear and complete description of the technical solution of the embodiments of the present disclosure will be provided below in conjunction with the accompanying drawings of the embodiments of the present disclosure. Apparently, the embodiments described are only a part of the embodiments of the present disclosure, rather than all the embodiments. Based on the embodiments in the present disclosure, all other embodiments obtained by those skilled in the art without involving any creative effort should be within the scope of protection of the present disclosure.

Key terms appearing in the present disclosure are explained below.

RDMA: Remote Direct Memory Access;

HCA: Host Channel Adapter;

Inter Planetary File System (IPFS), which is a global-oriented peer-to-peer distributed file system, that is, a distributed web, peer-to-peer hypermedia protocol, and may make our Internet faster, more secure, and more open;

Filecoin is the only incentive layer on the IPFS; in the present disclosure, it is defined as a process of obtaining reward by helping users to store data, and is divided into two processes, that is, data sealing and consensus proof.

Inter Planetary File System (IPFS) is to implement a decentralized storage solution proposed by the Web3.0. As a global-oriented peer-to-peer distributed version file system, IPFS has become a popular network storage protocol with the advantages of decentralization, openness, high security and transparency. IPFS is an underlying Internet protocol like the HTTP protocol, and has been successfully applied in various fields such as data storage, file transfer, network video, social media, and decentralized transactions. Driven by these technological trends, the related Filecoin (FIL) industry based on the IPFS network is also growing. Filecoin is a decentralized storage network that transforms cloud storage into an algorithmic market, where miners are rewarded by providing storage, distribution and retrieval data services needed to be paid by the customers. At present, the global IPFS project is gradually increasing, and the demand of data storage market is also gradually increasing. As an incentive layer, Filecoin has become the urgent demand of the market for IPFS. Filecoin is a process of obtaining reward by helping users to store data, which is divided into two processes, that is, data sealing and consensus proof.

Remote Direct Memory Access (RDMA) is a new direct memory access technology. RDMA allows a computer to directly access the memory of other computers without being processed by a processor. In terms of implementation, RDMA is actually a remote direct memory high-speed access technology fully optimized by intelligent network card and software architecture, which achieves the goal of high-performance remote direct data access by solidifying RDMA protocol on hardware (i.e. network card) and supporting Zero-copy and Kernel bypass.

At present, among Filecoin cluster nodes, data transmission among the nodes is realized based on a mainstream TCP/IP protocol, and the data needs to be copied for many times in an encapsulation process inside each node, that is, the data is copied into an operating system memory from a network card memory, and then copied into an encapsulation process memory. Excessive replications in the memory result in inefficient transmission efficiency of large amounts of data. In addition, the TCP/IP protocol is used for data transmission between cluster nodes, and TCP needs to perform "handshaking" for many times when establishing a link. The current data processing flow based on TCP/IP protocol also affects the efficiency of data transmission within a cluster.

As shown in FIG. 1, an embodiment of the present disclosure provides a data transmission method for Filecoin cluster based on remote direct memory access, and the Filecoin cluster comprises a plurality of encapsulation nodes. The method includes steps described below.

At step 11, a network card and an HCA card are provided and installed on a first encapsulation node, and an HCA card is installed on other encapsulation nodes of the Filecoin cluster.

At step 12, a RDMA protocol-based RDMA interface is provided at a data transmission interface of the Filecoin cluster.

At step 13, the first encapsulation node receives and encapsulates sector data transmitted from a client; invokes the RDMA interface after the encapsulation is completed to transmit the encapsulated sector data to the HCA card of the first encapsulation node; and serially transmits, through the HCA card of the first encapsulation node, the encapsulated sector data to the HCA card of the next encapsulation node.

At step 14, in response to a HCA card receiving the sector data transmitted from the previous encapsulation node, the RDMA interface is invoked to directly transmit the sector data to a user mode memory of an encapsulation node where the HCA card is located for encapsulation; after the encapsulation is completed, the RDMA interface is invoked to serially transmit the encapsulated sector data back to the HCA card, through which the sector data is transmitted to the HCA card of the next encapsulation node.

At step 15, the last encapsulation node receives, through the HCA card, the sector data transmitted from the previous encapsulation node, invokes the RDMA interface to directly transmit the sector data to a user mode memory of the last encapsulation node for encapsulation; after the encapsulation is completed, the RDMA interface is invoked to serially transmit the encapsulated sector data back to the HCA card of the last encapsulation node, through which the sector data is transmitted to distributed storage.

A RDMA protocol-based interface is added at the data transmission interface; encapsulated data is transmitted by invoking the RDMA interface, and the process of copying encapsulated data to the network card step by step inside the encapsulation node is eliminated.

Since multiple replications in the memory are not required, the data transmission efficiency is improved. The encapsulated sector data is serially transmitted in sequence, and the RDMA interface is provided so that the data may be transmitted directly to the buffer or may be received directly from the buffer, without being copied to the network layer, and context switching between the kernel mode and the user mode is omitted.

Note that the network card of the first encapsulation node receives the sector data transmitted from the client through the TCP/IP protocol.

In the Filecoin cluster, the conventional network card is replaced with the HCA card supporting the RDMA protocol to open the network channel of encapsulation nodes.

As known by those skilled in the art, Filecoin is a process of obtaining a reward by helping a user to store data, and is divided into two processes, namely, data sealing and consensus proof. The present disclosure focuses on the data sealing stage, and the data sealing stage mainly involves four sub-stages of Precommit 1, Precommit 2, Commit 1 and Commit 2. These stages are abbreviated as P1, P2, C1, C2, data is encapsulated in the four stages in turn, and these stages cannot be parallel.

Precommit1 stage (hereinafter referred to as P1 stage):
    A file needing to be stored by a user is divided into sectors with a size of 32 GB or 64 GB. In P1 stage, sector data is further divided by a miner first, and then stored in sequence, and 11 layers of calculations are needed during such process, and these calculations cannot be performed in parallel; in this stage, multiple sectors of data may be stored at the same time by means of a large-capacity memory, and the speed of the P1 stage is improved by optimizing, through software, the size of the memory occupied by storing one sector of data, and these calculations can only be performed by CPU in this stage;

Precommit2 stage (hereinafter referred to as P2 stage):
    In P2 stage, a Column Hash is calculated and a Replica is generated, and a corresponding Merkle tree is constructed, which is equivalent to a process of solving a problem and obtaining an answer. GPU is used to perform calculation in this stage.

Commit1 stage (hereinafter referred to as stage C1):
    Stage C1 is primarily used for preparing data required for Sector certificate. This time is very short, typically within one minute.

Commit2 stage (hereinafter referred to as stage C2):
    Stage C2 is the data processing of zero knowledge proof and a process of generating zero knowledge proof. This stage corresponds to a stage of confirming whether the answer is correct, and GPU is used to preform calculations in this stage.

In a traditional data transmission process, Filecoin cluster data nodes realize data transmission between clusters based on a mainstream TCP/IP protocol, and the technical solution thereof is as follows: 1. 32 GB or 64 GB of the client data is a data block, called as a sector, and the sector data is transmitted to the network card of the P1 node through the TCP/IP protocol. 2. The sector data is copied from the local network card buffer of the P1 node into a kernel mode memory corresponding to the network card; 3. The sector data is copied from the kernel mode memory corresponding to the network card into a kernel mode memory corresponding to the P1 process; 4. The sector data is copied from the kernel mode memory corresponding to the P1 process into a user mode memory corresponding to the P1 process; 5. The encapsulation of the sector data in the P1 stage is performed in the user mode memory; 6. The encapsulated sector data is written into the user mode memory corresponding to the P1 process; 7. The encapsulated sector data is copied into the kernel mode memory corresponding to the P1 process from the user mode memory corresponding to the P1 process; 8. The encapsulated sector data is copied into the kernel mode memory corresponding to the network card from the kernel mode memory corresponding to the P1 process; 9. The sector data is transmitted to the network card of the P2 node from the network card of the P1 node, and steps 1 to 8 are repeated; 10. The sector data is transmitted to the network card of the C1 & C2 node from the network card of the P2 node, and steps 1 to 8 are repeated; 11. The sector data is transmitted to distributed storage from the network card of the C1 & C2 node. The data needs to be copied at least three times inside each encapsulation node, that is, being copied into the memory of the operating system from the memory of the network card and then into the memory of the encapsulation process. The TCP/IP protocol is used for data transmission among cluster nodes, and TCP needs to perform three "handshakes" when establishing a link. The current data processing flow based on TCP/IP protocol affects the efficiency of data transmission within a cluster.

Figure 2:
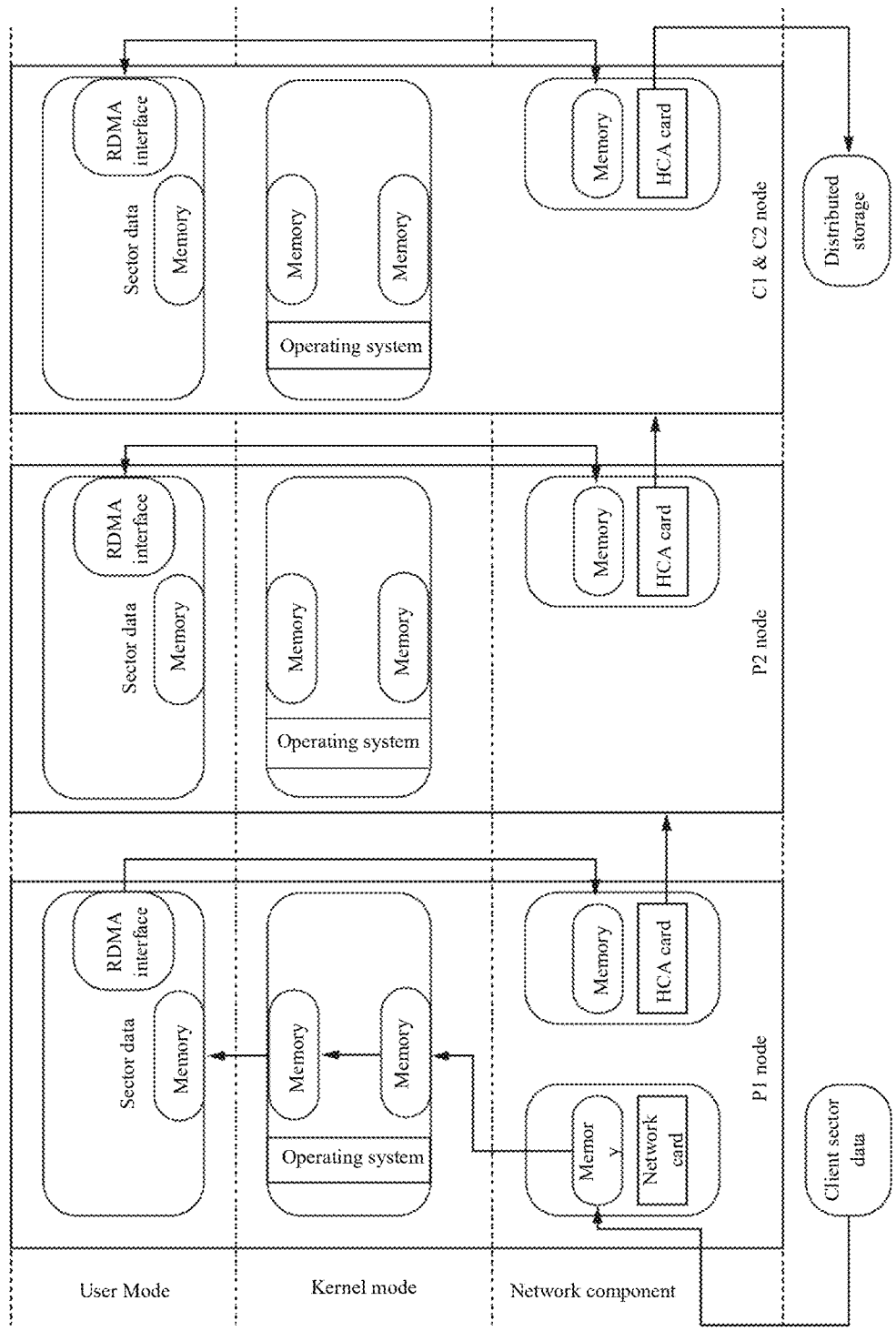
FIG. 2 is an RDMA-based data transmission logic flow of the method according to an embodiment of the present disclosure.

In view of the above, in some embodiments, a Filecoin cluster includes three encapsulation nodes, that is, P1 node, P2 node and C1 & C2 node; as shown in FIG. 2, the data encapsulation and transmission process using the method is as follows.

At step 21, the P1 node receives the sector data transmitted from the client for encapsulation; after the encapsulation is completed, the RDMA interface is invoked to transmit the encapsulated sector data to the HCA card of the P1 node, and the sector data is serially transmitted to the P2 node via the HCA card of the P1 node; and the encapsulation in the P1 stage is completed at the P1 node.

At step 22, the sector data is received by the HCA card of the P2 node, and the RDMA interface is invoked to directly transmit the sector data to the user mode memory of the P2 node for encapsulation; after the encapsulation is completed, the RDMA interface is invoked to serially transmit the encapsulated sector data back to the HCA card of the P2 node, and the encapsulated sector data is transmitted to the C1 & C2 node via the HCA card of the P2 node; and the encapsulation in the P2 stage is completed at the P2 node.

At step 23, the sector data is received by HCA card of the C1 & C2 node, and the RDMA interface is invoked to directly transmit the sector data to the user mode memory of the C1 & C2 node for encapsulation; after the encapsulation is completed, the RDMA interface is invoked to serially transmit the encapsulated sector data back to the HCA card of the C1 & C2 node, and the encapsulated sector data is transmitted to the distributed storage via the HCA card of the C1 & C2 node. Encapsulation on the C1 & C2 stages is completed at the C1 & C2 node.

Through the RDMA protocol, applications may perform data transmission directly without involving the network software stack. Data may be transmitted directly to the buffer or may be received directly from the buffer without being copied to the network layer. The application may perform data transmission directly in the user mode without context switching between the kernel mode and the user mode. The application may access the remote host memory without consuming any CPU in the remote host. The remote host memory may be read without involving a process (or CPU) on the remote host. The cache of the remote host's CPU is not filled with accessed memory contents. For example, a P1 node may perform the encapsulation of 2T sector data (30 P1 processes parallel encapsulation 64 GB) at the same time, when the encapsulation is completed, 2 TB data is all transmitted to the P2 node via a network card, and excessive memory replications and an inefficient TCP/IP protocol result in a huge amount of data transmission and low efficiency.

By providing the RDMA interface and the HCA card based on the RDMA protocol, the following copying processes are saved: the copying process existed in the process of transmitting sector data from the network card of the P1 node to the network card of the P2 node; and the copying process existed in the process of transmitting the sector data from the network card of the P2 node to the network card of the C1 & C2 node. Since excessive replications and the inefficient TCP/IP protocol result in a huge amount of data transmission and low efficiency, the arrangement of the present disclosure improves the efficiency of data transmission within a cluster.

In some embodiments, in the step, in which the P1 node receives the sector data transmitted from the client for encapsulation; after the encapsulation is completed, the RDMA interface is invoked to transmit the encapsulated sector data to the HCA card of the P1 node, and the sector data is serially transmitted to the P2 node via the HCA card of the P1 node, the P1 node receives the sector data transmitted from the client for encapsulation by the following steps.

At step 111, the sector data transmitted from the client is received by the network card of the P1 node.

At step 112, the sector data is copied into a kernel mode memory corresponding to the network card of the P1 node from a memory of the network card.

At step 113, the sector data is copied into a kernel mode memory corresponding to the P1 node process from the kernel mode memory corresponding to the network card.

At step 114, the sector data is copied into a user mode memory corresponding to the P1 node process from the kernel mode memory corresponding to the P1 node process.

At step 115, the sector data is encapsulated in the user mode memory of the P1 node.

In some embodiments, after the encapsulation is completed, the RDMA interface is invoked by the following steps.

At step 331, it is detected whether the sector data is encapsulated.

At step 332, the sector data that has been encapsulated is arranged in a queue in a sequential order.

At step 333, the RDMA interface is invoked according to the order of the queue. It is ensured that the sector data that has been encapsulated is transmitted serially in the sequential order when preempting the network card.

When being invoked, the RDMA interface accepts the request and transmits the sector data.

The embodiments of the present disclosure further provide a data transmission system for Filecoin cluster based on remote direct memory access, including a plurality of encapsulation nodes for sequentially encapsulating and transmitting sector data.

Each of the encapsulation nodes is provided with a RDMA interface, a HCA card and a user mode memory, and data is transmitted among the encapsulation nodes via the HCA network card.

The system includes an encapsulation module and an invocation module.

The first encapsulation node is further provided with a network card for receiving the sector data transmitted from a client.

The encapsulation module is configured to encapsulate the sector data in the user mode memory.

The invocation module is configured to invoke the RDMA interface to transmit the encapsulated data.

The HCA card of the last encapsulated node is further configured to transmit the sector data to distributed storage.

Figure 3:
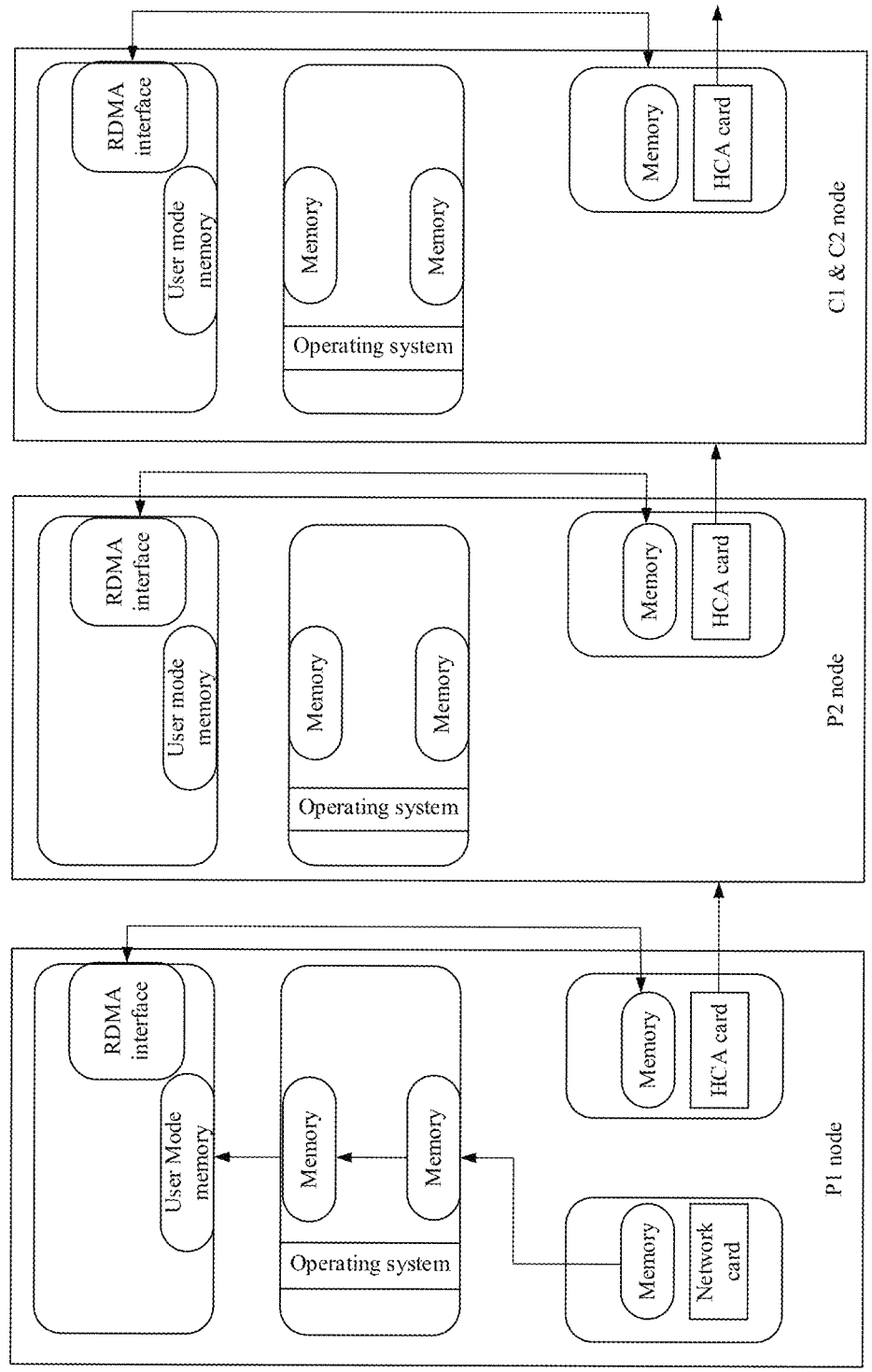
FIG. 3 is a connection block diagram of a system according to an embodiment of the present disclosure.

In some embodiments, as shown in FIG. 3, the encapsulation nodes include three nodes, that is, P1 node, P2 node and C1 & C2 node. The P1 node is the first encapsulation node, and the C1 & C2 node is the last encapsulation node. The system further includes a copying module.

The copying module is configured to copy the sector data received to the user mode memory of the P1 node step by step.

The invocation module is configured to: invoke the RDMA interface to transmit, via the RDMA interface, the encapsulated sector data in the user mode memory of the P1 node to the HCA card of the P1 node; invoke the RDMA interface to directly transmit the sector data to the user mode memory of the P2 node; invoke the RDMA interface to serially transmit the encapsulated sector data in the user mode memory of the P2 node to the HCA card of the P2 node; invoke the RDMA interface to directly transmit the sector data to the user mode memory of the C1 & C2 node; and invoke the RDMA interface to serially transmit the encapsulated sector data in the user mode memory of the C1 & C2 node to the HCA card of the C1 & C2 node.

The HCA card of the P1 node is configured to serially transmit the sector data to the P2 node.

The HCA card of the P2 node is configured to receive the sector data transmitted from the P1 node, and transmit the encapsulated sector data in the user mode memory of the P2 node to the C1 & C2 node.

The HCA card of the C1 & C2 node is configured to receive the sector data transmitted from the P2 node, and further configured to transmit the encapsulated sector data in the user mode memory of the C1 & C2 node to the distributed storage.

In some embodiments, the P1 node is further provided with a kernel mode memory.

The copying module is further configured to: copy the sector data into the kernel mode memory corresponding to the network card of the P1 node from the memory of the network card; copy the sector data into a kernel mode memory corresponding to the P1 node process from the kernel mode memory corresponding to the network card; copy the sector data to the user mode memory corresponding to the P1 node process from the kernel mode memory corresponding to the P1 node process.

Although the present application has been described in detail in conjunction with preferred embodiments with reference to the accompanying drawings, the present application is not limited thereto. Without departing from the spirit and essence of the application, those skilled in the art can make various equivalent modifications or replacements to the embodiments of the application, and these modifications or replacements should be within the scope of the application. Any changes or substitutions conceived by those skilled in the art can easily based on the technical scope disclosed in this application should be covered within the protection scope of this application. Therefore, the protection scope of the present application should be determined by the protection scope of the claims.

The invention claimed is:

1. A data transmission method for Filecoin cluster based on remote direct memory access, wherein the Filecoin cluster comprises a plurality of encapsulation nodes, and the method comprises:

providing a remote direct memory access (RDMA) protocol-based RDMA interface at a data transmission interface of the Filecoin cluster;

receiving and encapsulating, by a first encapsulation node, sector data transmitted from a client, after the sector data is encapsulated, invoking the RDMA interface to transmit the encapsulated sector data to a host channel adapter (HCA) card of the first encapsulation node, and serially transmitting, via the HCA card, the encapsulated sector data to a HCA card of a next encapsulation node;

in response to a HCA card of an encapsulation node receiving the sector data transmitted from a previous encapsulation node, invoking the RDMA interface to directly transmit the sector data to a user mode memory of the encapsulation node for encapsulation; after the sector data is encapsulated, invoking the RDMA interface to serially transmit the encapsulated sector data back to the HCA card, and transmitting, via the HCA card, the encapsulated sector data to the HCA card of a next encapsulation node; and receiving, by the HCA card of a last encapsulation node, the sector data transmitted from a previous encapsulation node, invoking the RDMA interface to directly transmit the sector data to the user mode memory of the last encapsulation node for encapsulation; after the sector data is encapsulated, invoking the RDMA interface to serially transmit the encapsulated sector data back to the HCA card of the last encapsulation node, and transmitting the sector data to distributed storage via the HCA card of the last encapsulation node;

wherein three Filecoin cluster comprises three encapsulation nodes, respectively being P1 node, P2 node and C1 & C2 node; and a data encapsulation and transmission process of the method is as follows:

receiving and encapsulating, by the P1 node, the sector data transmitted from the client, after the sector data is encapsulated, invoking the RDMA interface to transmit the encapsulated sector data to the HCA card of the P1 node, and serially transmitting the sector data to the P2 node via the HCA card of the P1 node;

receiving, by the HCA card of the P2 node, the sector data, and invoking the RDMA interface to directly transmit the sector data to the user mode memory of the P2 node for encapsulation; after the sector data is encapsulated, invoking the RDMA interface to serially transmit the encapsulated sector data back to the HCA card of the P2 node, and transmitting the sector data to the C1 & C2 node via the HCA card of the P2 node; and receiving, by the HCA card of the C1 & C2 node, the sector data, and invoking the RDMA interface to directly transmit the sector data to the user mode memory of the C1 & C2 node for encapsulation; after the sector data is encapsulated, invoking the RDMA interface to serially transmit the encapsulated sector data back to the HCA card of the C1 & C2 node, and transmitting the sector data to the distributed storage via the HCA card of the C1 & C2 node.

2. The data transmission method for Filecoin cluster based on remote direct memory access according to claim 1, wherein in the step of receiving and encapsulating, by the P1 node, the sector data transmitted from the client, after the sector data is encapsulated, invoking the RDMA interface to transmit the encapsulated sector data to the HCA card of the P1 node, and serially transmitting the sector data to the P2 node via the HCA card of the P1 node, the receiving and encapsulating, by the P1 node, the sector data transmitted from the client comprises:

receiving, by a network card of the P1 node, the sector data transmitted from the client; and copying the sector data received to the user mode memory of the P1 node step by step for encapsulation.

3. The data transmission method for Filecoin cluster based on remote direct memory access according to claim 2, wherein the copying the sector data received to the user mode memory of the P1 node step by step for encapsulation comprises:

copying the sector data into a kernel mode memory corresponding to the network card of the P1 node from a memory of the network card;

copying the sector data into a kernel mode memory corresponding to a P1 node process from the kernel mode memory corresponding to the network card;

copying the sector data into a user mode memory corresponding to the P1 node process from the kernel mode memory corresponding to the P1 node process; and encapsulating the sector data in the user mode memory of the P1 node.

4. The data transmission method for Filecoin cluster based on remote direct memory access according to claim 1, wherein after the sector data is encapsulated, invoking the RDMA interface by:

detecting whether the sector data has been encapsulated;

arranging the sector data that has been encapsulated in a queue in a sequential order; and invoking the RDMA interface according to the order of the queue.

5. The data transmission method for Filecoin cluster based on remote direct memory access according to claim 1, wherein when receiving the sector data transmitted from the client, the network card of the first encapsulation node receives the sector data transmitted from the client via a TCP/IP protocol.

6. A data transmission system for Filecoin cluster based on remote direct memory access, comprising a plurality of encapsulation nodes for sequentially encapsulating and transmitting sector data;

each of the encapsulation nodes is provided with a remote direct memory access (RDMA) interface, a host channel adapter (HCA) card and a user mode memory, and data is transmitted among the encapsulation nodes via the HCA card;

the system comprises: at least one processor; and a memory storing computer-readable instructions;

a first encapsulation node is further provided with a network card for receiving the sector data transmitted from a client;

wherein the processor is configured to call the computer-readable instructions to:

encapsulate the sector data in the user mode memory; and invoke the RDMA interface to transmit the encapsulated data;

the HCA card of a last encapsulated node is further configured to transmit the sector data to distributed storage;

wherein the encapsulation nodes comprise three nodes, respectively being P1 node, P2 node and C1 & C2 node; the P1 node is the first encapsulation node, and the C1 & C2 node is the last encapsulation node;

the HCA card of the P1 node is configured to serially transmit the sector data to the P2 node;

the HCA card of the P2 node is configured to receive the sector data transmitted from the P1 node; and further configured to transmit the encapsulated sector data in the user mode memory of the P2 node to the C1 & C2 node; and the HCA card of the C1 & C2 node is configured to receive the sector data transmitted from the P2 node, and further configured to transmit the encapsulated sector data in the user mode memory of the C1 & C2 node to the distributed storage.

7. The data transmission system for Filecoin cluster based on remote direct memory access according to claim 6, wherein the processor is further configured to call the computer-readable instructions to:

copy the sector data received to the user mode memory of the P1 node step by step;

invoke the RDMA interface to transmit, via the RDMA interface, the encapsulated sector data in the user mode memory of the P1 node to the HCA card of the P1 node; invoke the RDMA interface to directly transmit the sector data to the user mode memory of the P2 node; invoke the RDMA interface to serially transmit the encapsulated sector data in the user mode memory of the P2 node to the HCA card of the P2 node; invoke the RDMA interface to directly transmit the sector data to the user mode memory of the C1 & C2 node; and invoke the RDMA interface to serially transmit the encapsulated sector data in the user mode memory of the C1 & C2 node to the HCA card of the C1 & C2 node.

8. The data transmission system for Filecoin cluster based on remote direct memory access according to claim 7, wherein the P1 node is further provided with a kernel mode memory;

the processor is configured to call the computer-readable instructions to copy the sector data into a kernel mode memory corresponding to the network card of the P1 node from the memory of the network card; copy the sector data into a kernel mode memory corresponding to a P1 node process from the kernel mode memory corresponding to the network card; copy the sector data into the user mode memory corresponding to the P1 node process from the kernel mode memory corresponding to the P1 node process.

9. The data transmission method for Filecoin cluster based on remote direct memory access according to claim 1, wherein the data encapsulation comprises four stages of Precommit 1, Precommit 2, Commit 1 and Commit 2.

10. The data transmission method for Filecoin cluster based on remote direct memory access according to claim 9, wherein the encapsulation in the Precommit 1 stage is completed at the P1 node.

11. The data transmission method for Filecoin cluster based on remote direct memory access according to claim 9, wherein the encapsulation in the Precommit 2 stage is completed at the P2 node.

12. The data transmission method for Filecoin cluster based on remote direct memory access according to claim 9, wherein the encapsulation in the Commit 1 & Commit 2 stage is completed at the C1 & C2 node.

13. The data transmission method for Filecoin cluster based on remote direct memory access according to claim 1, further comprising:
  installing a network card and the HCA card on the first encapsulation node, and installing the HCA card on other encapsulation nodes of the Filecoin cluster.

14. The data transmission system for Filecoin cluster based on remote direct memory access according to claim 6, wherein the processor is configured to:
  detect whether the sector data has been encapsulated;
  arrange the sector data that has been encapsulated in a queue in a sequential order; and
  invoke the RDMA interface according to the order of the queue.

15. The data transmission system for Filecoin cluster based on remote direct memory access according to claim 6, wherein the network card of the first encapsulation node receives the sector data transmitted from the client via a TCP/IP protocol.

16. The data transmission system for Filecoin cluster based on remote direct memory access according to claim 7, wherein each of the encapsulation nodes is further provided with a memory corresponding to the HCA card.

17. The data transmission system for Filecoin cluster based on remote direct memory access according to claim 16, wherein the processor is further configured to invoke the RDMA interface to transmit, via the RDMA interface, the encapsulated sector data in the user mode memory of the P1 node to the memory corresponding to the HCA card of the P1 node; invoke the RDMA interface to directly transmit the sector data to the user mode memory of the P2 node; invoke the RDMA interface to serially transmit the encapsulated sector data in the user mode memory of the P2 node to the memory corresponding to the HCA card of the P2 node; invoke the RDMA interface to directly transmit the sector data to the user mode memory of the C1 & C2 node; and invoke the RDMA interface to serially transmit the encapsulated sector data in the user mode memory of the C1 & C2 node to the memory corresponding to the HCA card of the C1 & C2 node.

18. A non-transient computer-readable storage medium, wherein the non-transient computer-readable storage medium stores computer-readable instructions that, when executed by a processor, cause the processor to perform operations of:
  providing a remote direct memory access (RDMA) protocol-based RDMA interface at a data transmission interface of a Filecoin cluster;
  receiving and encapsulating, by a first encapsulation node of the Filecoin cluster, sector data transmitted from a client, after the sector data is encapsulated, invoking the RDMA interface to transmit the encapsulated sector data to a host channel adapter (HCA) card of the first encapsulation node, and serially transmitting, via the HCA card, the encapsulated sector data to a HCA card of a next encapsulation node of the Filecoin cluster;
  in response to a HCA card of an encapsulation node receiving the sector data transmitted from a previous encapsulation node, invoking the RDMA interface to directly transmit the sector data to a user mode memory of the encapsulation node for encapsulation; after the sector data is encapsulated, invoking the RDMA interface to serially transmit the encapsulated sector data back to the HCA card, and transmitting, via the HCA card, the encapsulated sector data to the HCA card of a next encapsulation node; and
  receiving, by the HCA card of a last encapsulation node of the Filecoin cluster, the sector data transmitted from a previous encapsulation node, invoking the RDMA interface to directly transmit the sector data to the user mode memory of the last encapsulation node for encapsulation; after the sector data is encapsulated, invoking the RDMA interface to serially transmit the encapsulated sector data back to the HCA card of the last encapsulation node, and transmitting the sector data to distributed storage via the HCA card of the last encapsulation node;
  wherein three Filecoin cluster comprises three encapsulation nodes, respectively being P1 node, P2 node and C1 & C2 node; and a data encapsulation and transmission process comprises:
  receiving and encapsulating, by the P1 node, the sector data transmitted from the client, after the sector data is encapsulated, invoking the RDMA interface to transmit the encapsulated sector data to the HCA card of the P1 node, and serially transmitting the sector data to the P2 node via the HCA card of the P1 node;
  receiving, by the HCA card of the P2 node, the sector data, and invoking the RDMA interface to directly transmit the sector data to the user mode memory of the P2 node for encapsulation; after the sector data is encapsulated, invoking the RDMA interface to serially transmit the encapsulated sector data back to the HCA card of the P2 node, and transmitting the sector data to the C1 & C2 node via the HCA card of the P2 node; and
  receiving, by the HCA card of the C1 & C2 node, the sector data, and invoking the RDMA interface to directly transmit the sector data to the user mode memory of the C1 & C2 node for encapsulation; after the sector data is encapsulated, invoking the RDMA interface to serially transmit the encapsulated sector data back to the HCA card of the C1 & C2 node, and transmitting the sector data to the distributed storage via the HCA card of the C1 & C2 node.

* * * * *